United States Patent [19]

Martel et al.

[11] 4,413,167
[45] Nov. 1, 1983

[54] MICROWAVE EGG COOKER

[75] Inventors: Thomas J. Martel, North Reading; Robert F. Bowen, Burlington, both of Mass.

[73] Assignee: Raytheon Company, Lexington, Mass.

[21] Appl. No.: 338,692

[22] Filed: Jan. 11, 1982

[51] Int. Cl.³ .............................................. H05B 6/64
[52] U.S. Cl. .................. 219/10.55 E; 219/10.55 D; 99/DIG. 14; 99/451
[58] Field of Search ............... 219/10.55 E, 10.55 F, 219/10.55 D, 10.55 R; 99/451, DIG. 14

[56] References Cited

U.S. PATENT DOCUMENTS

| 3,935,415 | 1/1976 | Moore | 219/10.55 F |
| 4,317,017 | 2/1982 | Bowen | 219/10.55 E |
| 4,327,267 | 4/1982 | Ikeda et al. | 219/10.55 F |
| 4,345,133 | 8/1982 | Cherney et al. | 219/10.55 F |
| 4,362,917 | 12/1982 | Freedman et al. | 219/10.55 E |

FOREIGN PATENT DOCUMENTS 50-118540 9/1975 Japan .
50-119048 9/1975 Japan .
50-119049 9/1975 Japan .
52-16466 4/1977 Japan .
54-101643 7/1979 Japan .

Primary Examiner—B. A. Reynolds
Assistant Examiner—Philip H. Leung
Attorney, Agent, or Firm—William R. Clark; Joseph D. Pannone

[57] ABSTRACT

A microwave egg cooking utensil having a microwave transparent container for water, a metal tray with at least one depression for holding the egg, and a metal lid. Both the tray and the lid are supported by a lip of the container such that there is a small gap between the outer perimeter edge of the tray and the inner surface of the lid. The combination of the tray and the lid provides substantial microwave shielding of the interior there defined; the separation of these metal parts prevents arcing therebetween. It is preferable that the edge of the tray be raised from the lip so that the small gap is not filled with condensation which would minimize the effect of the gap. The water in the container is heated to boiling by radiation of microwave energy. The steam heats the tray and the egg cooks by conduction rather than by microwave radiation.

15 Claims, 7 Drawing Figures

MICROWAVE EGG COOKER

BACKGROUND OF THE INVENTION

Egg poachers which are used on conventional top surface heaters typically consist of a metal pan, a metal tray having depressions therein, and a metal lid. Water is placed in the pan and then the tray is inserted thereover. Eggs are cracked and the contents are emptied into respective depressions. After the lid is positioned over the tray, the poacher is placed on a conventional gas surface burner or electric surface coil where the water is brought to boiling so as to heat the egg through the tray by conduction. Some heating may also result from the presence of steam at the top surface of the eggs.

The above described poacher can not be used to cook eggs in a microwave oven because the metal parts reflect microwave energy and the water would not heat to boiling. Further, if all the parts were made of a microwave transparent material, the direct exposure of the eggs to microwave energy would result in egg yolks exploding: a yolk, just like the egg shell itself, is an enclosed membrane and will explode if heated without limit. Also, if the eggs are to be shielded from microwave energy while the water is to be exposed, there is a problem preventing microwave arcing between contacting or joined metal parts that shield the eggs.

SUMMARY OF THE INVENTION

The invention discloses the combination of a microwave transparent container having a side wall with an outwardly extending lip at the top, a microwave reflective tray for supporting food to be cooked, the tray being removably supported by the lip, and a microwave reflected lid removably supported by the container such that the outer perimeter edge of the tray is spaced from the inner surface of the lid by a gap of less than 0.5 inches. The tray may preferable have at least one depression for holding an egg during cooking. More preferably there may be four depressions for holding four individual eggs. The eggs may be placed in the depressions in their shells for hard cooking or the shells may be cracked and the contents poured into the depressions for poached eggs. Preferably the tray and lid may comprise aluminum. It is also may be preferable that the gap around the entire perimeter edge of the tray and the inner surface of the lid be approximately one-eighth inch. This spacing may prevent arcing while at the same time substantially shield the eggs from microwave energy. It is not absolutely essential that a perfect microwave choke be created between the tray and the lid; some exposure of the eggs to microwave energy will not be deleterious.

The invention also discloses the combination of a microwave transparent container comprising a substantially flat bottom, a continuous side wall extending upwardly from the perimeter of the bottom, a lip extending outwardly from the top of the wall, and a raised portion on the outer region of the lip, a microwave reflective tray for supporting food to be cooked, the tray being removably supported by an inner region of the lip, and a microwave reflective lid removably supported by an outer region of the lip, the lid being held in substantially fixed horizontal alignment with the container by the raised portion, the outer perimeter edge of the tray being spaced from the inner surface of the lid by a gap of less than 0.5 inches. The raised portion to hold the lid in fixed horizontal alignment may preferably be a plurality of raised bumps around the perimeter of the other region of the lip, which bumps define the shape of the lid.

The invention may be practiced by a utensil for cooking an egg in a microwave oven, comprising a microwave transparent container having an outwardly extending lip from the top of a side wall thereof, a microwave reflective tray having a peripheral region removably suppoted on the lip, the perimeter edge of the tray being spaced above the lip, and a microwave reflective lid removably supported by the container, the perimeter edge of the tray being spaced from the inner surface of the lid by a gap of less than 0.5 inches. The tray may preferably have at least one depression for holding an egg during cooking. The egg may be in its shell or the contents of the egg poured into the depression. It may be preferable that the perimeter edge of the tray be bent upwardly. As an alternate embodiment it may be preferable that the lip have a trough therein to separate the edge of the tray from the surface of the lip.

The invention also teaches a utensil for cooking an egg in a microwave oven, comprising a microwave transparent container defining a substantially flat bottom, a continuous side wall extending upwardly from the perimeter of the bottom, an outwardly extending lip from the top of the wall, and a continuous band extending upwardly from the outside of the lip, a metallic tray having a peripheral region removably supported on the lip in fixed horizontal alignment with the container, the tray having at least one depression therein for holding an egg, and a metallic lid removably supported by the lip and held in fixed horizontal alignment with the container by the band, the outer perimeter edge of the tray being spaced from the inner surface of the lid by a gap of less than 0.5 inches, the outer perimeter edge also being spaced from the surface of the lip.

BRIEF DESCRIPTION OF THE DRAWINGS

The foregoing and other objects and advantages of the invention will be more fully understood by reading the following Description of the Preferred Embodiment with reference to the drawings wherein.

DESCRIPTION OF THE PREFERRED EMBODIMENT

Figure 1:
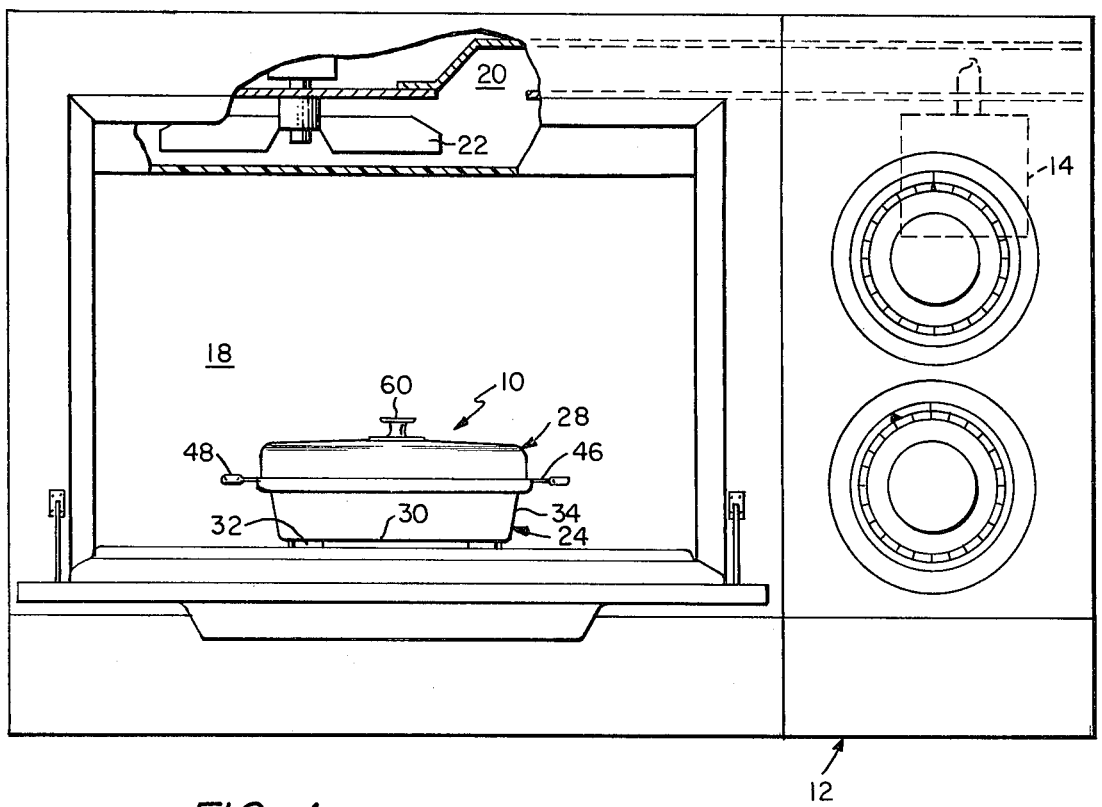
FIG. 1 is a microwave egg cooker embodying the invention as viewed in a microwave oven.

Referring to FIG. 1, there is shown a microwave egg cooker 10 or utensil embodying the invention. The egg cooker is positioned in a conventional microwave oven 12. Microwave energy typically having a frequency of 2450 MHz is provided by magnetron 14 and is coupled to cavity 18 by suitable means such as, for example, through waveguide 20 past mode stirrer 22. It may preferrable to use a primary radiator (not shown) in the cavity to provide a directive pattern. Other conventional microwave oven parts and features such as, for example, the door and door seal are not described in detail as they are well known in the art.

Figure 3:
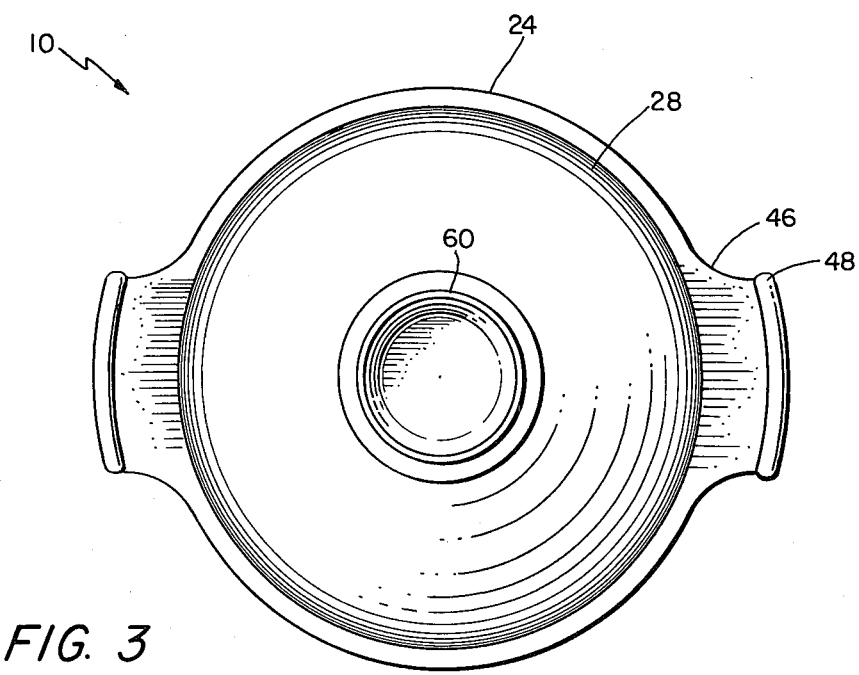
FIG. 3 is a top view of the microwave egg cooker.
Figure 4:
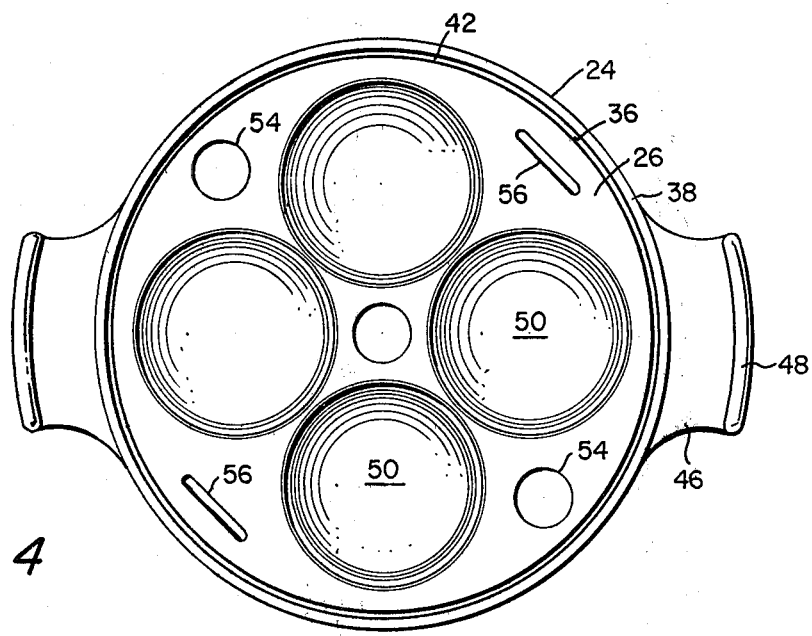
FIG. 4 is a top view of the microwave egg cooker with the lid removed.
Figure 2:
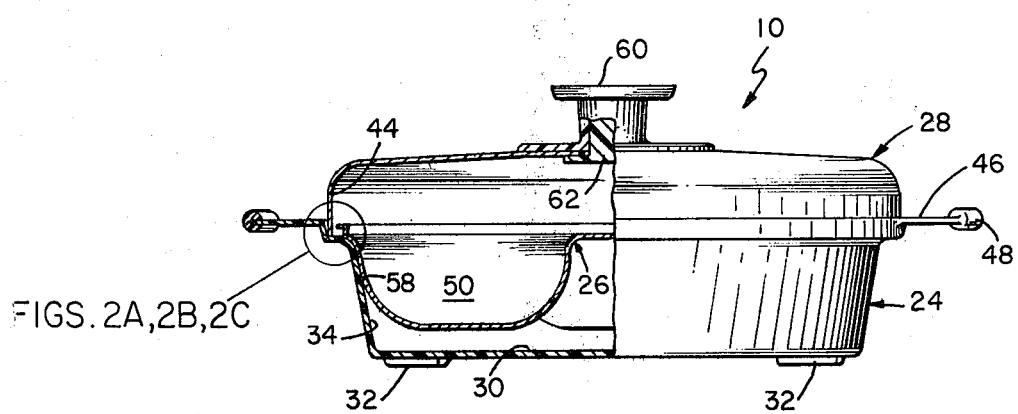
FIG. 2 is a partially cut away front elevation of the microwave egg cooker.
Figure 2A:
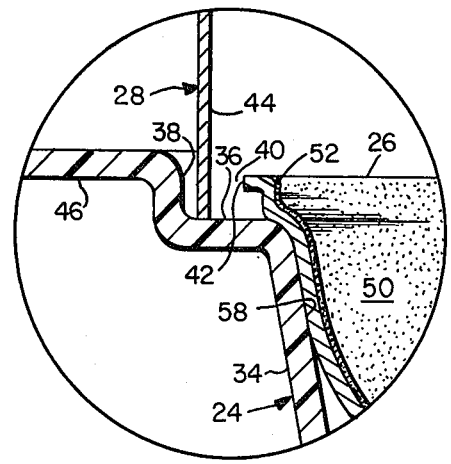
FIG. 2A is an expanded view from FIG. 2.
Figure 2B:
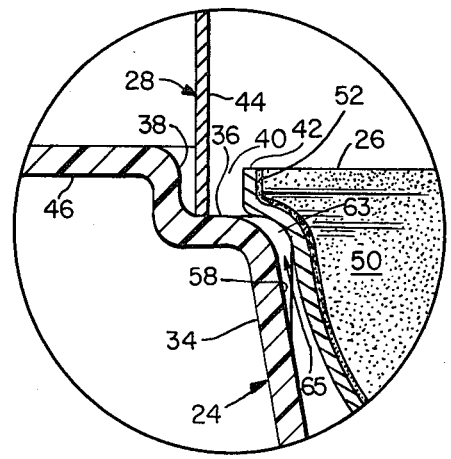
FIG. 2B is an alternate embodiment of FIG. 2A.
Figure 2C:
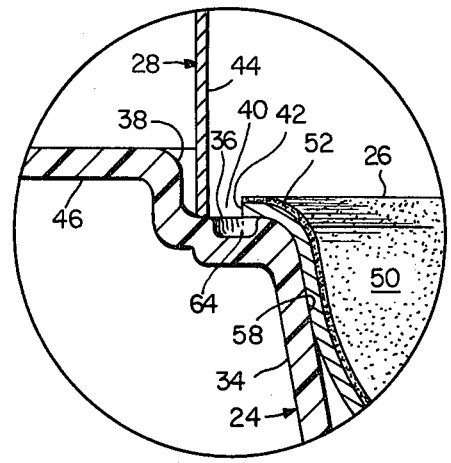
FIG. 2C is an alternate embodiment of FIG. 2A.

Referring to FIG. 2, a partially cut away front elevation view of egg cooker 10 is shown. The three composite parts of egg cooker 10 are container 24, tray 26 and lid 28. FIG. 2A is an expanded view from FIG. 2 and FIGS. 2B and 2C are alternate embodiments of FIG. 2A. FIG. 3 is a top view of egg cooker 10. FIG. 4 is a top view of egg cooker 10 with lid 28 removed. The identifying numerals refer to the several parts throughout the same drawings.

Container 24 or pan is made of a microwave transparent or low loss material such as, for example, methylpentane (TPX). As will be described later herein, water is poured into container 24 and heated to boiling by radiation of microwave energy. Accordingly, the material of container 24 in addition to being microwave transparent must also be resistant to temperatures on the order of 212° F. and higher. Methylpentane which is relatively inexpensive provides these material characteristics and is also relatively strong and resistant to impact.

Container 24 has a substantially flat bottom 30 which is elevated by legs 32 to provide some thermal insulation between container 24 and any supporting structure. The use of individual legs allows for circulating air to pass under container 24. As shown, container 24 has a circular side wall 34 that conforms at the top to the shape of tray 26. In other embodiments which are not shown, tray 26 may have other perimeter shapes such as, for example, square in which case container 24 would have four sides to conform to the tray. Side wall 34 tapers slightly outwardly so that tray 26 may easily be removed from the supported position shown in the drawings. At the top of side wall 34, container 24 extends outwardly to provide lip 36 which supports tray 26. Lip 36 extends to raised portion 38 which may preferably be a continuous band around the periphery of lip 36 as shown or at least three riser bumps (not shown) which define the shape of lid 28. Other embodiments will be described later herein with reference to FIGS. 2A-C. The function of raised portion 38 is to align lid 28 when it is supported on container 24 such that there is an approximate one-eighth inch gap 40 between the entire outer perimeter edge 42 of tray 26 and the inner surface 44 of lid 28. As will be described later herein, both the tray and the lid are fabricated from microwave reflective or conductive materials such as the metal aluminum. Accordingly, the approximate one-eighth inch gap provides sufficient spacing to prevent arcing between the two parts in the presence of microwave energy. At the same time, the two parts are close enough together to provide substantial microwave shielding for the interior defined therein. Handles 46 extend outwardly from container 24 for picking up the utensil. For convenience, more than two handles may be provided or the handle may be in the embodiment of a continuous ring (not shown). Grips 48 may facilitate easier and more secure handling of the utensil.

Tray 26 is fabricated of a microwave reflective or conductive material such as a metal. Preferably, aluminum may be used because of its light weight. Tray 26 has at least one receptacle 50 for holding an egg during cooking. Preferably, a plurality such as four receptacles are provided so that more than one egg can be cooked simultaneously. A receptacle defines a depression or pan-shaped holder preferably having a volume of 75 milliliters or greater. It has been determined that the contents of the average jumbo egg has a displacement of approximately 61 milliliters. The additional 14 milliliters provides a spaced above the egg and a measure of tolerance. The shape may be circular or other as preferred. The upper surface of tray 26 may preferably be covered with a coating 52 of non-stick material such Teflon to provide easy removal of the eggs after cooking. The Teflon coating is shown only in expanded views 2A-C. Receptacles 50 may be removable from the tray or part of a unitary tray construction as shown. If the receptacles are removable, it is preferable that design steps be taken to prevent arcing between the tray and the receptacles. Apertures 54 function as finger holes so that tray 26 may be positioned within container 24 where it is supported. The finger holes may preferably have a diameter below cut off for microwave energy at 2450 MHz so that microwave energy will not couple to the interior defined by tray 26 and lid 28. After cooking when the tray is hot, a fork may be inserted through slot 56 to remove the tray from the container so as to empty eggs from receptacles 50. The periphery of tray 26 has substantially the same shape and size as lip 36 so that the tray may be supported thereby; the shape as shown in the Figures is circular. The outer sides of receptacles seat against the inner surfaces 58 of side wall 34 of the container to provide fixed horizontal alignment between the tray and the container. Accordingly, when lid 28 is positioned over container 24 and horizontally aligned to the container by raised portions 38, approximately one-eighth gap is maintained between the entire perimeter edge 42 of the tray and the lid because both are horizontally aligned to the container. The tray could be shaped in other embodiments to provide the horizontal alignment.

Lid 28 as described earlier herein, is fabricated of a microwave reflective or conductive material such as the metal aluminum. The outer shape of lid is such that it may be removably seated on lip 36 over container 24 and horizontally aligned thereto by raised portions 38. Handle 60 consists of a microwave transparent material and is attached through hole 62 which has a diameter that is smaller than the microwave cut off for a frequency of 2450 MHz.

In operation, a small amount of water such as a half a cup is poured into container 24. Using apertures 54, tray 26 is seated onto container 24 where it is held in fixed horizontal alignment thereto. Egg shells are cracked and the contents emptied into respective receptacles 50. Next, the lid is seated over container 24 forming the approximate one-eighth inch gap 40 between the outer perimeter edge 42 of the tray and the inner surface 44 of the lid. When exposed to microwave energy in the microwave oven, the water heats to boiling because the container is transparent to microwave energy. The steam heats tray 26 and by conduction, the eggs in receptacles 50 cook. The eggs themselves are substantially shielded from microwave energy by the combination of the metal tray and lid. If hard-cooked (hard-boiled) eggs are desired rather than poached, the eggs may be placed into receptacles 50 without cracking the shells.

Referring specifically to FIGS. 2A-C, alternate embodiments of the relationships between perimeter edge 42 and inner surface 44 are shown. As stated earlier, to provide a partial choke, it is desirable that the two parts be approximately one-eighth inch apart around the entire perimeter edge 42. It has also been found that it is desirable not to have the thin edge of the tray rest directly against lip 36. If this were to happen, water from the steam could condense on lip 36 reducing the effectiveness of the gap and result in arcing between the thin edge of the tray and the innersurface 44 of the lid. In the embodiment shown in FIG. 2A, the perimeter edge of the tray is elevated from lip 36 so that any condensation of water will not be in the gap 40 defined therebetween. In FIG. 2B, the perimeter edge 42 of the tray is bent upwardly so that there is not a thin edge adjacent to inner surface 44. Also, FIG. 2B shows rib 63 which may preferably be used to provide a channel 65 between the tray and container so as to prevent the accumulation of condensed water in gap 40. A plurality of ribs may be fabricated around the perimeter of the container or the tray to provide a plurality of drainage channels. The ribs could be used in the embodiments of FIGS. 2A and 2C. In FIG. 2C, a trough 64 is provided in lip 36 so that the gap 40 between the thin perimeter edge 42 and inner surface 44 will not be filled with moisture.

This completes the description of the preferred embodiments. A reading of it by one skilled in the art will bring to mind many modifications and alterations without departing from the spirit and scope of the invention. Accordingly, it is intended that the scope of the invention be limited only by the appended claims.

What is claimed is:

1. A utensil for steam cooking in a microwave oven, comprising:
    a microwave transparent container for holding water, said container having a side wall with an outwardly extending lip at the top;
    a microwave reflective tray for supporting food to be cooked, said tray being removably supported by said lip, said tray having a substantially horizontal peripheral flange, the outer perimeter edge of said flange being spaced above said lip; and
    a microwave reflective lid removably supported by said lip of said container, said outer perimeter edge of said flange being spaced from the inner surface of said lid by a gap of less than 0.5 inches.

2. The combination in accordance with claim 1 wherein said tray has at least one depression for holding an egg during cooking.

3. The combination in accordance with claim 1 wherein said tray and said lid comprise aluminum.

4. The combination in accordance with claim 1 wherein said gap is approximately one-eighth inch around the entire perimeter of said tray.

5. A utensil for steam cooking in a microwave oven, comprising:
    a microwave transparent container for holding water, said container comprising a substantially flat bottom, a continuous side wall extending upwardly from the perimeter of said bottom, a lip extending outwardly from the top of said wall, and a raised portion on the outer region of said lip;
    a microwave reflective tray for supporting food to be cooked, said tray being removably supported by an inner region of said lip, said tray having a substantially horizontal peripheral flange, the outer perimeter edge of said flange being spaced above said lip; and
    a microwave reflective lid removably supported by an outer region of said lip, said lip being held in substantially fixed horizontal alignment with said container by said raised portion, said outer perimeter edge of said flange being spaced from the inner surface of said lid by a gap of less than 0.5 inches.

6. The combination in accordance with claim 5 wherein said tray has at least one depression for holding an egg during cooking.

7. The combination in accordance with claim 5 wherein said tray and said lid comprise aluminum.

8. The combination in accordance with claim 5 wherein said raised portion comprises a plurality of raised bumps around the perimeter of said outer region of said lip.

9. A utensil for cooking an egg in a microwave oven, comprising:
    a microwave transparent container having an outwardly extending lip from the top of a side wall thereof;
    a microwave reflective tray having a peripheral region removably supported on said lip, said peripheral region comprising a substantially horizontal outer flange, the perimeter edge of said flange being spaced above said lip; and
    a microwave reflective lid removably supported by said container, said perimeter edge of said flange being spaced from the inner surface of said lid by a gap of less than 0.5 inches.

10. The utensil recited in claim 9 wherein said tray has at least one depression for holding an egg during cooking.

11. The utensil recited in claim 9 wherein said tray and said lid comprise aluminum.

12. The utensil recited in claim 9 wherein there is a trough in said lip to space the surface of said lip from said perimeter edge of said tray.

13. A utensil for cooking an egg in a microwave oven, comprising:
    a microwave transparent container defining a substantially flat bottom, a continuous side wall extending upwardly from the perimeter of said bottom, an outwardly extending lip from the top of said wall, and a continuous band extending upwardly from the outside of said lip;
    a metallic tray having a peripheral region removably supported on said lip in a fixed horizontal alignment with said container, said peripheral region comprising a substantially horizontal outer flange, the perimeter edge of said flange being spaced above said lip, said tray having at least one depression therein for holding an egg; and
    a metallic lid removably supported by said lip and held in fixed horizontal alignment with said container by said band, said outer perimeter edge of said flange being spaced from the inner surface of said lid by a gap of less than 0.5 inches.

14. The utensil recited in claim 13 wherein said tray has four depressions for holding four individual eggs.

15. The utensil recited in claim 13 wherein there is a trough in said lip to space the surface of said lip from said perimeter edge of said tray.

* * * * *